Sept. 20, 1971     A. J. BROWNING     3,606,372
WHEELED LUGGAGE
Filed May 21, 1969     4 Sheets-Sheet 1
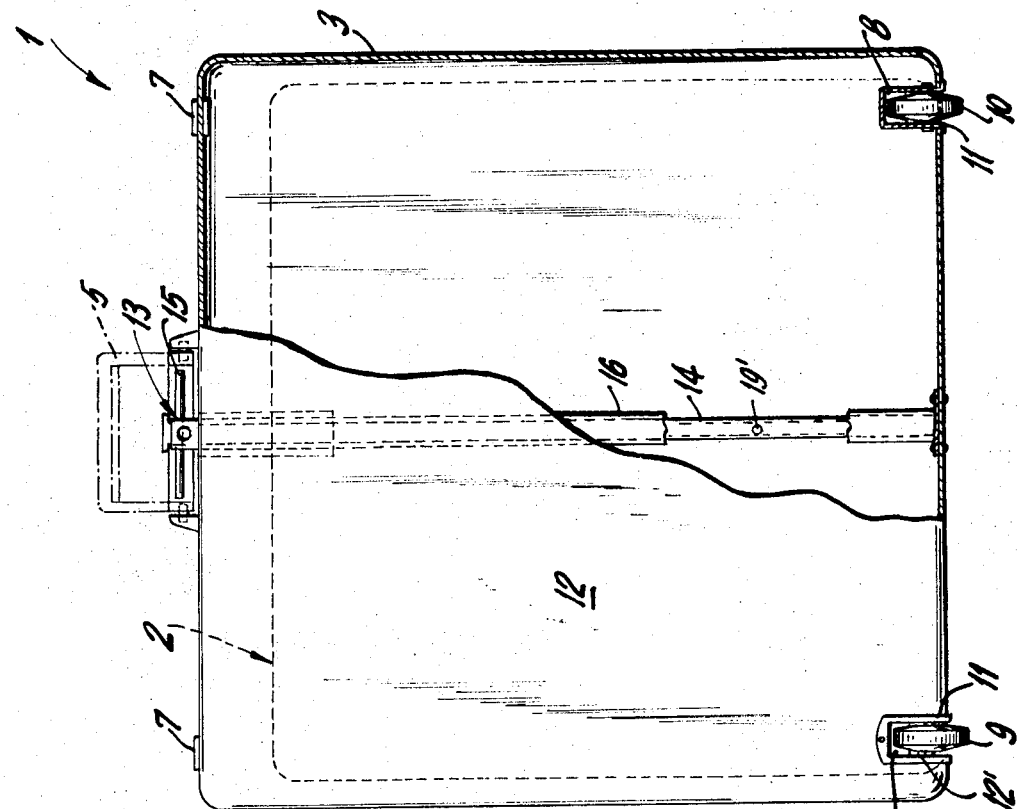
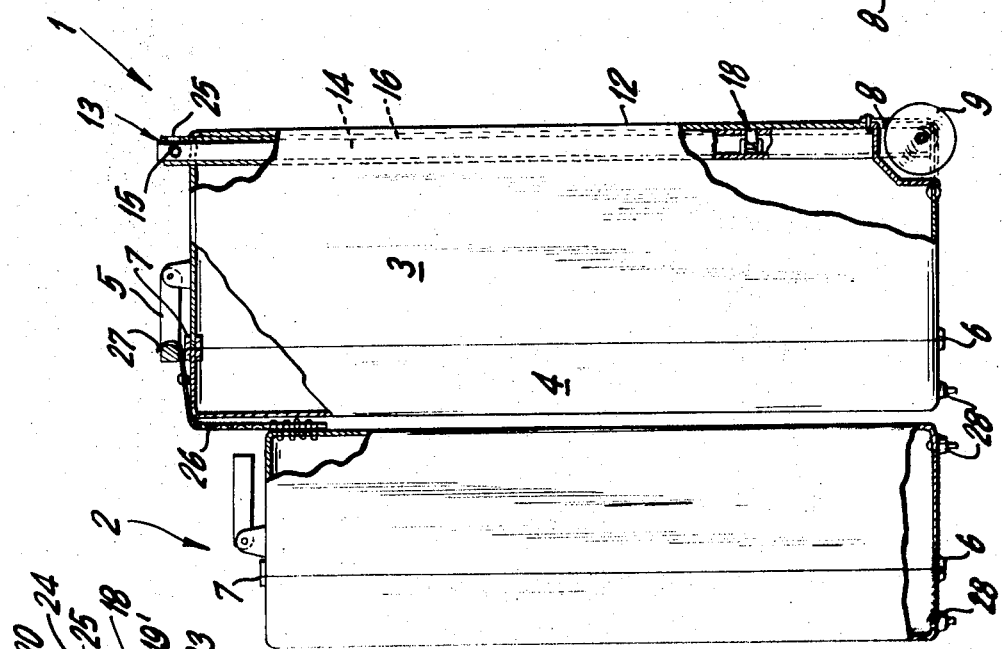
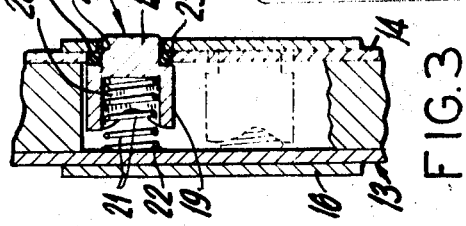
INVENTOR
ARTHUR J. BROWNING
BY
Morgan, Finnegan, Durham & Pine
ATTORNEYS INVENTOR.
ARTHUR J. BROWNING
BY
Morgan, Finnegan, Durham & Pine
ATTORNEYS Sept. 20, 1971

A. J. BROWNING 3,606,372

WHEELED LUGGAGE

Filed May 21, 1969

INVENTOR.
ARTHUR J. BROWNING

BY
Morgan, Finnegan, Durham & Pine
ATTORNEYS.

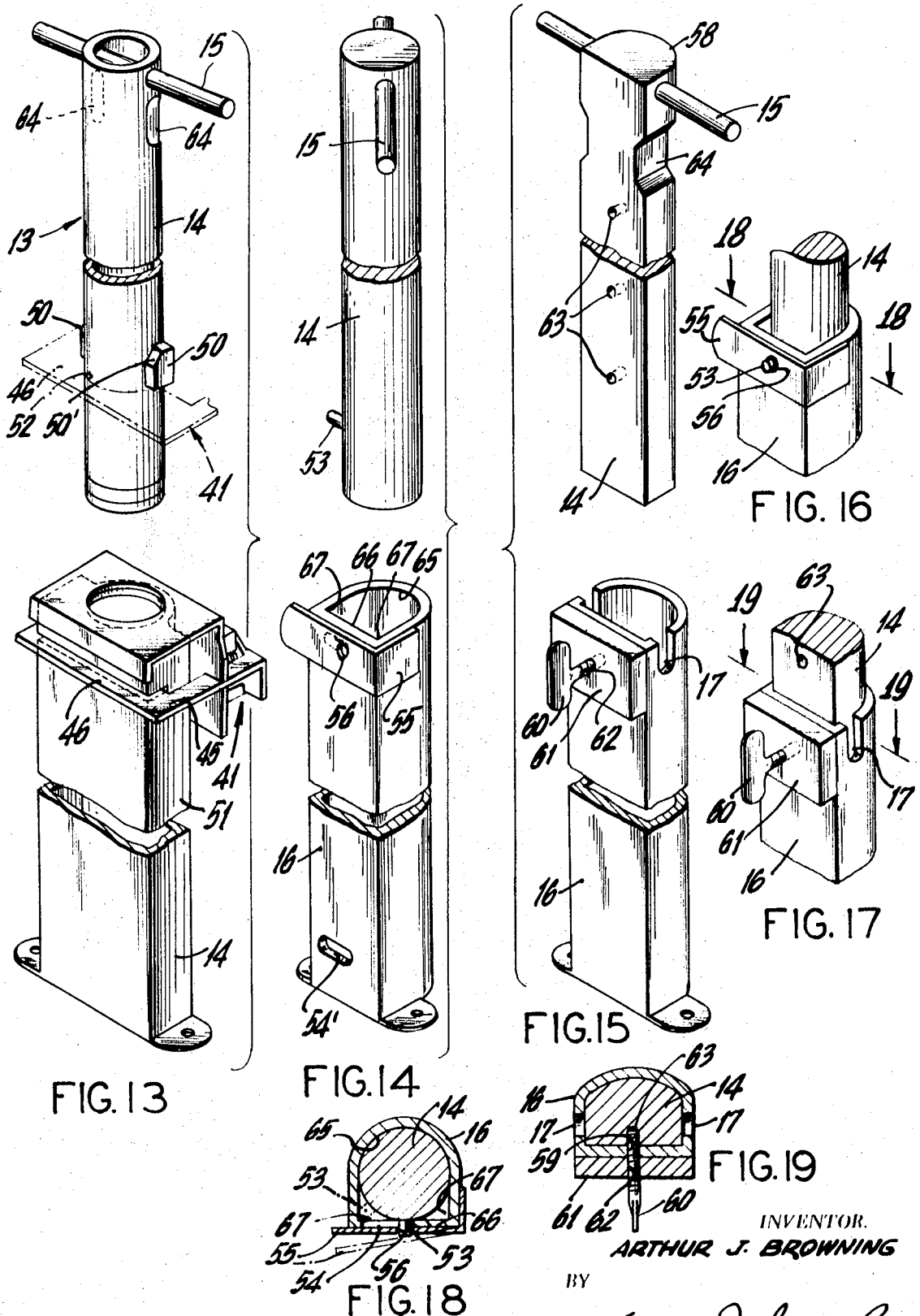

United States Patent Office 3,606,372
Patented Sept. 20, 1971

3,606,372
WHEELED LUGGAGE
Arthur J. Browning, Downers Grove, Ill.
(P.O. Box 234, R.R. 7, Mount Vernon, Ill. 62864
Filed May 21, 1969, Ser. No. 826,405
Int. Cl. B62b 1/04
U.S. Cl. 280—47.17                           15 Claims

ABSTRACT OF THE DISCLOSURE

A luggage ensemble comprised of a plurality of suitcases provided with wheels and a retractable handle. The luggage ensemble utilizes the shape of respective suitcases and means, such as a strap or belt, to retain them in secured relationship and to facilitate storage in conventional terminal lockers.

FIELD OF THE INVENTION

The present invention relates generally to luggage. More particularly, the present invention is directed to mobile luggage specifically designed to fit conventional lockers found in railroad and bus terminals and still facilitate transportation of a large load by an individual.

BACKGROUND OF THE INVENTION

Description of the prior art

At present, many devices exist for transporting luggage and suitcases. The most common type of these devices are mobile or wheeled luggage and hand trucks. Many of the presently known mobile luggage designs include retractable handles and some also include means for maintaining a plurality of suitcases in an attached relationship.

However, none of the presently known suitcase arrangements are designed to efficiently utilize the storage space in conventional lockers found in railroad and bus terminals. Basically, the conventional lockers found in railroad and bus terminals are provided with internal dimensions of about fifteen inches wide, twenty-two inches high and twenty-eight inches deep. Consequently, the presently known mobile luggage cannot make maximum use of the conventional lockers. In addition, the mobile suitcases of the presently known designs include retractable wheels which must be recessed into the body of the suitcase and which require a mechanical linkage and locking means to afford movement between the nested and operative positions or separate wheel assemblies which must be strapped to the suitcase.

Moreover, the presently known mobile suitcases which also use retractable handles have the suitcase grip handle located along one of the long sides thereof and the retractable handle on one of the short sides. Consequently, the dimensions of any suitcase designed for storage in conventional railroad and bus terminal lockers must be shorter than the locker on two sides to accommodate both suitcase handles if the retractable handle feature is to be employed. Also, the single shaft retractable handles lack satisfactory means to prevent rotation within the handles housing. While rotation of the retractable handle is not a material hindrance in a conventional suitcase, it will hinder storage of a suitcase in a conventional locker.

Furthermore, most prior art mobile suitcases have pivotally mounted handles for pushing the suitcase. Generally, these pivotally mounted handles deflect between a long and a short side of the suitcase and provide a design which lacks proper balance desirable for wheeling the suitcase.

SUMMARY OF THE INVENTION

It is, therefore, an object of the present invention to provide luggage consisting of two suitcases which can be attached to each other for portage and which can conveniently fit within a conventional locker found in airport, bus and railroad terminals.

It is another object of the present invention to provide luggage consisting of several suitcases wherein the larger of the suitcases is provided with wheels and a retractable handle to facilitate transportation thereof, but which do not interfere with storage of the suitcases in a locker found in airport, bus and railroad terminals.

It is a further object of the present invention to provide a wheeled suitcase which can transit from the wheeled mode to the carried mode without tilting or reorienting the suitcase. This advantage results from having the retractable handle and the conventional carrying handle on the same surface.

To this end, a luggage ensemble is comprised of a main suitcase and an auxiliary suitcase. The main suitcase is formed of a base and a top which are attached by typical hinges and locks and has a substantially square configuration (21" x 21") with a depth of about 8". The main suitcase is also provided with wheels, a retractable handle and the conventional suitcase grip handle. The wheels are mounted in recesses in the base of the suitcase along the edge remote from the conventional suitcase grip handle and the retractable handle is mounted in a tubular housing which is located inside the suitcase and which extends along the base floor from the suitcase edge on which the wheels are mounted to the edge in proximity to the grip handle. The retractable handle is provided with a grip that projects beyond the tubular mount to the same elevational level as the conventional suitcase handle when in the nested or inoperative position. Means to prevent the retractable handle from rotation during the stored periods and means to lock the retractable handle in the nested position or a variety of operative positions are also provided. The auxiliary suitcase, sized to fit within the main suitcase when not in use, (19" x 19" x 6") is provided with a strap or similar means to attach to the first suitcase to facilitate transportation of the two suitcases concomitantly.

Functionally, the suitcases are put in condition for portage by attaching them together by the strap provided therefor, elevating the retractable handle to an operative position and tilting the composite luggage assembly to rest entirely on the wheels of the main suitcase.

DESCRIPTION OF THE DRAWINGS

The invention will be described and understood more readily in connection with the attached drawings of which:

FIG. 1 is a side elevational view of one embodiment of the luggage ensemble of the present invention;

FIG. 2 is a rear elevational view, partly in section, of the suitcase embodied in FIG. 1;

FIG. 3 is a sectional elevational view of the handle locking means shown in FIG. 1;

FIG. 12 is a sectional view taken through line 12—12 of FIG. 11;

FIG. 13 is an exploded view of another embodiment of the retractable handle and locking means therefor of the subject invention;

FIG. 14 is still another embodiment of a retractable handle and locking means therefor of the present invention;

FIG. 15 is an exploded view of another embodiment of the retractable handle and locking means therefor of the present invention;

FIG. 16 is a perspective view of the retractable handle of FIG. 14 showing the lock means in its engaged state;

FIG. 17 is a perspective view of the retractable handle of FIG. 15 with the lock engaged;

FIG. 18 is a sectional view taken through line 18—18 of FIG. 16;

FIG. 19 is a sectional view taken through line 19—19 of FIG. 17.

DESCRIPTION OF THE PREFERRED EMBODIMENTS

Figures 5, 11:
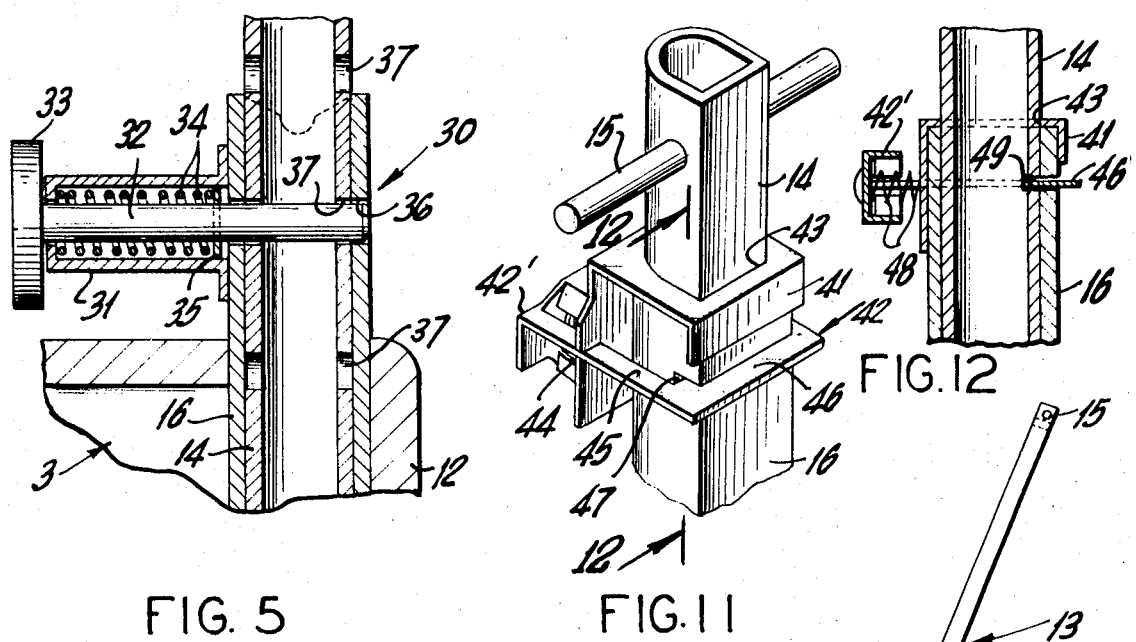
FIG. 5 is a partial sectional elevational view of the means for locking the retractable handle in the operative and nested positions.
FIG. 11 is a perspective view of one embodiment of the locking means for the retractable handle.

The present invention is directed primarily to providing a luggage ensemble comprised of two distinct suitcases configured to fit together in a conventional storage locker found in railroad, bus and airport terminals. The invention also provides a suitcase configuration which affords compact storage of the smaller of the suitcases within the larger suitcase. In addition, the luggage ensemble includes wheels and a retractable handle which afford mobility therefor. The invention also comprehends means for nesting the retractable handle within the larger suitcase and locating the wheels strategically to insure minimum interference with the sides of a locker during storage and assure maximum utilization of the suitcase interior.

FIGS. 1 and 2 depict a composite luggage ensemble comprised of a main suitcase 1 and an auxiliary suitcase 2. Basically, the main suitcase 1 and the auxiliary suitcase 2 are configured to conveniently fit within a conventional terminal locker. Conventional terminal lockers have internal dimensions of about fifteen inches in width, twenty-two inches in height and twenty-eight inches in depth. Essentially, the dimensions of the main suitcase are twenty-one inches by twenty-one inches by eight inches and the dimensions of the auxiliary suitcase are nineteen inches by nineteen inches by six inches. Consequently, the main suitcase 1 and the auxiliary suitcase 2 will both occupy virtually the entire volume from the rear of a locker to a location about seven inches from the front. A standard size piece can then fit in the front of the locker.

Structurally, the main suitcase 1 includes a body or base section 3, a top 4 and a conventional suitcase handle 5. The suitcase top 4 is attached to the body 3 by hinges 6 which also may be of the conventional type and is provided with latch members 7 to insure positive closure of the suitcase.

Figure 6:
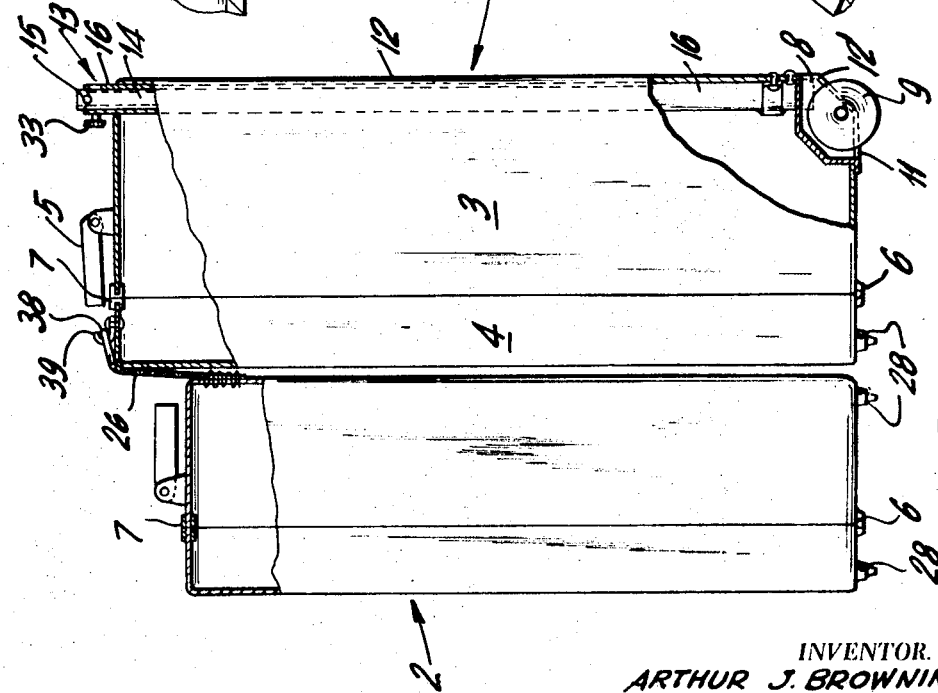
FIG. 6 is a side elevational view of a further embodiment of the luggage ensemble of the present invention.

The base 3 of the suitcase 1 has a conventional suitcase handle 5 and is provided with two recesses 8 which extend into the edge remote from the handle 5. The recesses 8 are provided for wheels 9 and 10 and can be either formed in the base 3 during the molding operation or cut and fit therein depending on the material used to fabricate the suitcase. The wheels 9 and 10 can be journaled in a bearing surface extending into the respective walls 11 of recesses 8 or alternatively by an axle extending the entire length of the lower edge of the base 3. As seen in FIG. 1, the wheels 9 and 10 can protrude beyond the outline of the bottom 12 of the base 3 or can be arranged to extend only to the bottom 12, as best seen in FIG. 6.

The base 3 of the suitcase 1 is also provided with a retractable handle 13 comprised of a rod member 14 which may be solid or tubular and a grip 15 which extends transversely to the longitudinal axis of the rod 14. The retractable handle 13 is slidably mounted in a tubular housing 16 which may conform essentially to the shape of the retractable handle 13.

As is seen in the embodiment of FIGS. 1 and 2, the tubular mount 16 for the retractable handle 13 is provided with a recess 17 at its upper end in which the grip member 15 rests when the retractable handle is in the nested position. This design prevents the retractable handle 13 from rotating about its longitudinal axis. Consequently, the grip 15 can not interfere with the locker walls when the suitcase 1 is stored in a conventional locker. The elevation of the top of the retractable handle 13 is designed to be in the same elevational plane as the upper surface of the suitcase handle 5 when folded into the inoperative position as best seen in FIG. 1.

The retractable handle 13 is also provided with means to lock it in the nested position and a variety extended positions. One embodiment of the locking means is a spring biased detent 18, seen in FIG. 3. The detent 18 is comprised of a body section 19, a reduced extension 19', a cavity 20 in the body section 19 and a spring 21. The spring 21 is secured at one end to the inner surface of the retractable handle 13 by any convenient means such as welds 22 and fits within the cavity 20 to mount and position the detent 18. An opening 23 in the retractable handle rod 14 is provided for the passage of the reduced extention 19' to maintain the retractable handle 13 in the nested position in the absence of a manual force acting to elevate the rod 14. In practice, it has been found convenient to machine the retractable handle rod 14 with an opening large enough to insert the detent 18 and, subsubsequently insert a ring 24 in the wall of the retractable handle 13 to confine the detent 18. Any number of detents 18 can be provided in the rod 14, the number and location being a matter of individual choice.

The mounting shaft 16 is provided with a single hole 25 located just above the upper surface of the suitcase. The hole 25 is provided to accommodate the detent reduced extension 19' and afford positive locking of the retractable handle 13 at one of its elevated positions. The location of the detent 18 will determine the height of the retractable handle 13 in its operative position. In practice, it has been found that locating the detent approximately 18 inches from the grip 15 will provide the most versatile design.

In operation, the retractable handle 13 may be elevated to its operative position by manually gripping the grip 15 and pulling upwardly. As the retractable handle 13 is elevated, the detent surface bears against the inside wall of the tubular housing 16 and slides in intimate contact therewith until it reaches the opening 25, at which point it snaps into the opening 25 under the force of the spring 20.

When storing the suitcase, the retractable handle 13 must be returned to its nested position. This is achieved by pressing the detent 18 beyond the inner wall of the mounting tube 16 and depressing retractable handle 13 until the grip 15 fits in the mounting tube recess 17. The force of the spring 20 will insure positive nesting of the retractable handle 13 until a manual force is exerted to elevate the retractable handle 13.

In addition, strap means are provided to attach the auxiliary suitcase 2 to the main suitcase 1. One form of the strap means is seen in FIG. 1 wherein a strap 26 is shown having a hook 27 to effect attachment of the auxiliary suitcase 2 to the handle 5 of the main suitcase 1. The strap 26 which can be formed of any suitable material, such as canvas, can either be sewn or rivited to the suitcase 2.

Both the main suitcase 1 and the auxiliary suitcase 2 are provided with feet 28 depending from the side of the suitcase opposite the handle 5. The feet 28 are sized to extend to the bottom of the wheels 9 and 10 to cooperate therewith to provide a level support for the suitcases when in the standing or storage position. The feet 28 also serve to act as brake means to prevent the suitcase from rolling.

Figure 4:
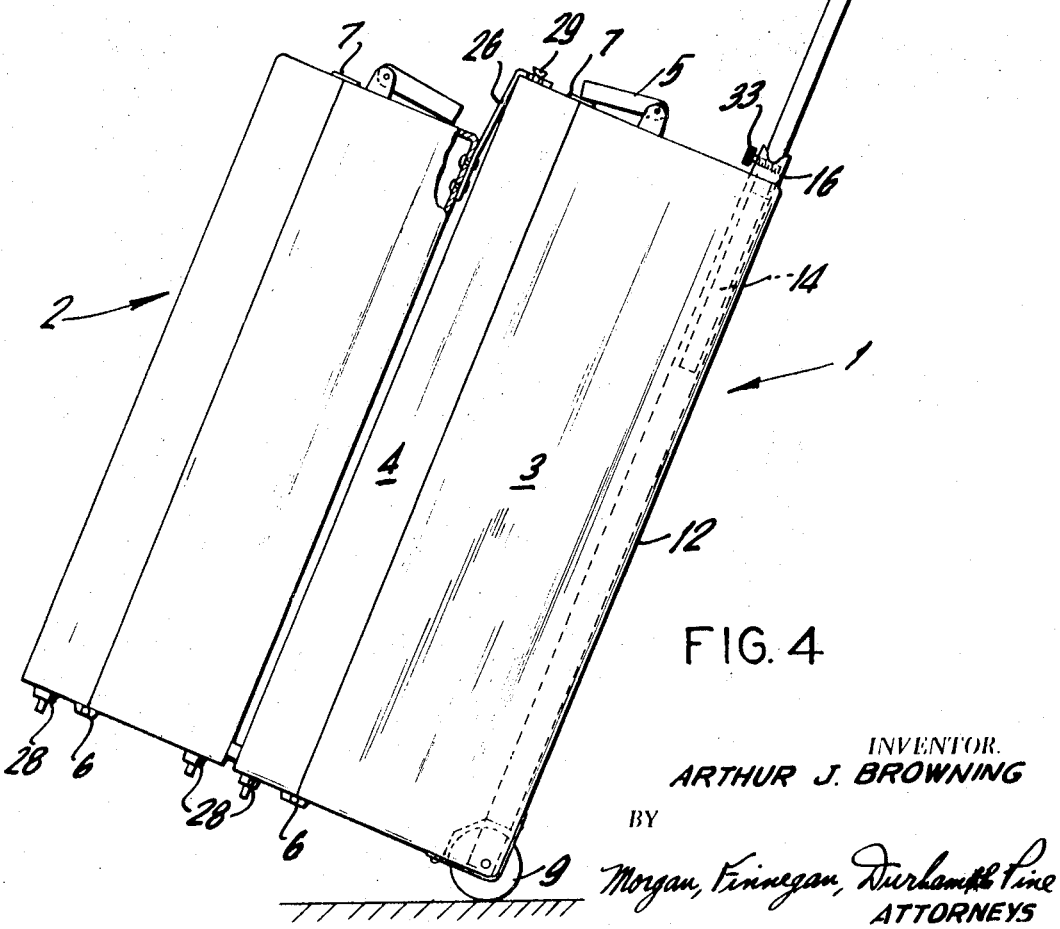
FIG. 4 is a side elevational view of another embodiment of the luggage ensemble of the present invention tilted into the portage position.

A variety of modifications to the basic composite luggage ensemble are presented in the following embodiments. As seen in FIG. 4, the luggage ensemble depicted is similar to the embodiment shown in FIGS. 1 and 2. Structurally, the embodiment of FIG. 4 differs in that the locking means for securing the retractable handle 13 in the elevated position is mounted on the tubular housing 16 and the strap 26 is mounted on a knob 29 extending from the main suitcase 1 rather than the handle 5.

A detailed view of the locking means is seen in FIG. 5 wherein a detent 30 is comprised of a housing 31, a detent pin 32 having a knob 33 and a spring 34. The detent pin 32 is provided with a stop member 35 extending laterally therefrom to locate the pin. A hole 36 is formed in the tubular housing 16 in alignment with the detent pin 32 and a plurality of holes 37 are formed in the retractable handle rod 14 at a number of locations for the passage of the detent pin 32. The spring 34 is arranged around the detent pin 32 and bears against the housing 31 at one end and the laterally extending stop member 35 to bias the detent pin 32 toward the hole 36. Functionally, the pin is adapted to extend through the hole 36 in the mounting tube 14 and one of the holes 37 in the rod 14 to lock the retractable handle 13 in a particular position.

In operation, the retractable handle 13 can be elevated to any position wherein one of the holes 37 is in alignment with the hole 36 in the mounting shaft 16. The force of the spring 34 bearing against the stop 35 will cause the detent pin 32 to pass through the aligned openings 36–37 and positively lock the retractable handle 13 in the elevated or operative position. With a plurality of strategically located holes 37, the retractable handle 13 can be raised to a variety of advantageous positions.

FIGS. 6 through 10 show another embodiment of the basic luggage ensemble. Again, the means for maintaining the main suitcase 1 and the auxiliary suitcase 2 in fixed relationship differs slightly from the straps of the other embodiments since the strap 26 terminates in a ring 38 and the main suitcase 1 is provided with a hook 39 to cooperate with the ring 38.

In addition, the recessed wheels 9 are adapted to extend only into alignment with the surface of wall 12 of the suitcase 1. With this design, a more compact assembly is provided since nothing projects beyond the rear wall 12 of the suitcase 1.

Figure 10:
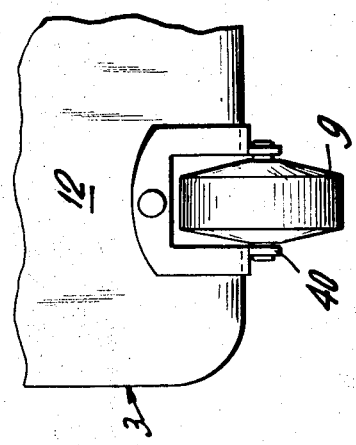
FIG. 10 is a rear elevational view of the wheel seen in FIG. 9.
Figure 8:
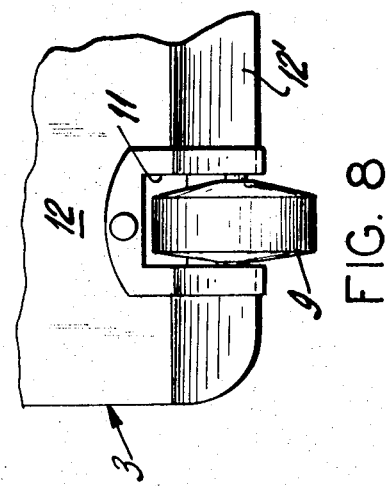
FIG. 8 is a rear elevational view of one of the designs for the recessed wheel of the present invention.
Figure 9:
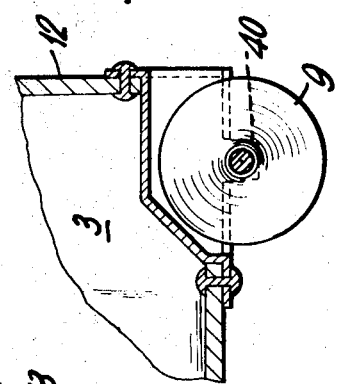
FIG. 9 is a side sectional elevational view of another wheel assembly suitable for use in the present invention.

In practice, it has been found that the wheels 9 can be journaled in the walls 11 of recess 8, as seen in FIGS. 6 and 8, or can be mounted in depending support members 40 shown in FIGS. 9 and 10. If the wheels 9 are journaled in the walls 11 of the recess 8, a bevel surface 12' of about 45° should be provided for the edge of the suitcase adjacent the wheels 8 to facilitate rolling the luggage ensemble without interference. Alternatively, any contour, such as a rounded surface can be provided above the suitcase edge instead of bevel surface 12'. Effectively, this design is directed to avoiding any structural extension that might interfere with wheeling of the suitcase.

Figure 7:
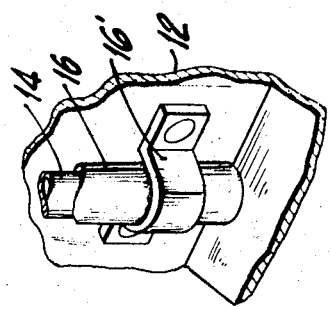
FIG. 7 is a detailed view of the attachment employed to secure the tubular mount for the retractable handle to the suitcase.

FIG. 7 shows the clamp 16' used to fixedly attach housing 16 to the bottom wall 12 of base 3. The housing 16 can be welded to the clamp 16' to insure against rotation thereof.

FIGS. 11 and 12 depict an alternative arrangement for the retractable handle locking means. Basically, the locking means consists of a mounting plate 41 and a detent 42. The plate 41 is provided with an opening 43 for the passage of the retractable handle rod 14 and slots 44 to slidably accommodate the detent 42. The detent 42 is comprised of a button surface 42', arm 45 and a transversely extending stop member 46. The supporting plate is adapted to fit securely on the top of the tubular housing 16 and mount the detent 42 for slidable movement into and out of a slot 47 in the housing 16. The button 42' is biased away from the surface of the tubular housing 16 by a spring 48. The rod 14 of the retractable handle 13 is provided with a plurality of transverse slots 49 which can be aligned with the slot 47 in the housing 16.

In operation, the detent 42 is engaged by exerting a manual force on the button 42' to move the stop member 46 out of the slot 49 in the retractable handle rod 14. The retractable handle 13 can then be elevated or depressed to any position wherein a slot 49 is in alignment with the slot 47. Removal of the force on the button 42' causes the spring 48 to return the stop member 46 through the slot 47 in the mounting tube 16 and into the slot 49 in the retractable handle rod 14 which is in alignment with the slot 47. Any number of slots 49 can be put in the retractable handle rod 14 to enable locking of the handle 13 at various heights. It is particularly desirable to have one of the slots 49 located at a position which will insure positive locking of the retractable handle in the nested position.

FIG. 13 discloses another embodiment of the retractable handle 13 and locking means therefor. The retractable handle 13 is circular in cross-sectional shape and has a single set of diametrically opposed lugs 50 arranged thereon. The tubular housing 16 is formed with extended sides 51 to afford uninhibited vertical movement of the retractable handle 13 and attached lugs 50. The detent 41 is similar to the detent of FIGS. 11 and 12 (like parts having like numbers) but includes a curved indentation 52 on the stop 46 to afford access to the lugs 50 on the retractable handle rod 14. The lugs 50 are provided with a chamfered surface 50' to facilitate engagement and disengagement of the detent 41. The distance from the stop 46 to the top of the tubular housing 16 is the same as the height of the lugs 50. This design assures positive locking of the handle 13 to prevent vertical movement thereof.

FIGS. 14, 16 and 18 show still another embodiment of the retractable handle 13 and locking means therefor. The retractable handle rod 14 is circular in cross-sectional shape while the tubular housing 16 is formed of an arcuate wall 65 and a flat opposed surface 66. The cross-sectional configuration of the tubular housing 16 effected by the arcuate wall 65 and surface 66 provides a surface conforming to a portion of the surface of the rod 14 and corner 67 which extend beyond the surface of the rod 14. The locking means for the retractable handle is comprised of a pin 53 arranged to extend from the retractable handle to one corner 67 of the mounting tube 16. The flat surface of the mounting tube 16 is provided with slots 54 and 54' into which the pin 53 can be rotated. Slot 54 is located in the portion of the housing 16 which extends from the suitcase. A leaf spring member 55 with a hole 56 is attached to the exterior of the mounting tube 16 at the location of the uppermost slot 54. The hole 56 in the leaf spring member 55 is arranged in alignment with said uppermost slot 54. The slot 54' is located at the bottom of the mounting tube 16 to facilitate maintaining the retractable handle 13 in the nested position.

In operation, the retractable handle 13 is released from its nested position by rotating handle rod 14 such that the pin 53 is rotated from the slot 54' into a corner 67 of the housing interior. The retractable handle 13 is then raised to the level wherein the pin 53 and the slot 54 are in alignment. At this point, the rotatable handle 13 is rotated to pass the locking pin 53 through the slot 54. The force of the pin 53 on the leaf spring 55 forces the leaf spring outwardly, as seen in FIG. 18, to a point wehrein the deflection of the leaf spring is sufficient to allow the locking pin 53 to enter the hole 56 therein.

Still another embodiment of the retractable handle 13 is shown in FIGS. 15, 17 and 19. The retractable handle rod 14 of this embodiment is formed with a flat surface 57 and a rounded surface 58 and the tubular housing 16 is configured to conform to the contour of the retractable handle rod 14. The tubular housing 16 has a threaded hole 59 at a level just below the top. A threaded mounting pin 60 is screwed into the hole 59. For reinforcement, a block 61 can be provided with a threaded hole 62 in alignment with the threaded hole 59. The retractable handle rod 14 is provided with a plurality of holes 63 which either may or may not be threaded. The holes 63 are vertically aligned with the hole 59 in the tubular housing 16. In operation, the retractable handle 13 is first elevated to any position wherein one of the holes 63 in the retractable handle rod 14 is in alignment with the locking pin 60. Next, the locking pin 60 is screwed into the hole 63 to positively position the retractable handle 13.

Grooves or recesses 17 are provided in the top of the tubular housing 16 to accommodate the retractable handle grip 15 and serve as additional locking means for the retractable handle 13 when in the nested position. Also, finger grooves 64 in the retractable handle rod 14 can be provided to facilitate gripping of the grip 15.

It will be obvious to those skilled in the art that various changes may be made in the invention without departing from the spirit and scope thereof.

What is claimed is:

1. A luggage ensemble comprising:
   a main suitcase;
   an auxiliary suitcase;
   means for detachably attaching the auxiliary suitcase to the main suitcase;
   wheels located along an edge of the body of the main suitcase to facilitate manual rolling of the luggage ensemble;
   a single retractable handle formed of a rod and a grip member located at the upper extremity of the rod;
   a tubular housing for slidably accommodating the retractable rod, which tubular housing is fixedly attached to the inner surface of the bottom of the main suitcase and arranged to extend from the edge of the suitcase at which the wheels are located and project beyond the surface of the opposite side of the suitcase;
   means to prevent the retractable rod from inadvertently rotating within the tubular housing when the retractable rod is in the nested or extended position; and
   means to lock the retractable handle in the extended position.

2. Apparatus as in claim 1 further comprising a conventional suitcase handle located on the side of the main suitcase through which the tubular housing projects.

3. Apparatus as in claim 2 further comprising means to lock the retractable handle at a plurality of elevations.

4. Apparatus as in claim 3 wherein the portion of the tubular housing which projects outwardly from the edge of the body of the main suitcase directly opposite the edge on which the wheels are located is provided with a recess in the upper extremity thereof to accommodate the retractable handle grip when the retractable handle is in the nested position.

5. Apparatus as in claim 4 wherein the inner surface of tubular housing and the outer surface of the retractable handle rod are of the same asymetrical cross-sectional shape.

6. Apparatus as in claim 4 wherein the main suitcase has the dimensions of 21" x 21" x 8" and the auxiliary suitcase has the dimensions of 19" x 19" x 6".

7. Apparatus as in claim 4 wherein the wheels extend to the outer surface of the wall of the body on which the tubular housing is mounted and wherein the edge of the body of the suitcase along which the wheels are located is provided with a contour.

8. Apparatus as in claim 7 wherein the contour is a bevel of 45°.

9. Apparatus as in claim 7 further comprising mounting means for the wheels which depend downwardly to a position below the surface of the suitcase.

10. A luggage ensemble comprising:
    an auxiliary suitcase;
    means for detachably attaching the auxiliary suitcase to the main suitcase;
    wheels located along an edge of the body of the main suitcase;
    a retractable handle having a rod and a grip member located at the upper extremity of the rod;
    a tubular housing adapted to slidably accommodate the rod of the retractable handle, which tubular housing is fixedly attached to the inner surface of the bottom of the main suitcase and arranged to extend from the edge of the suitcase at which the wheels are located and beyond the surface of the opposite side of the suitcase and which portion projecting beyond the surface of the suitcase is provided with a recess to accommodate the retractable handle grip when the retractable handle is in the nested position and which portion has a hole formed therein; and
    a spring biased detent located within the retractable handle rod, in such a manner as to project a portion thereof beyond a surface of the exterior surface of the retractable handle rod and fit within the hole in the tubular mounting housing when aligned therewith.

11. A luggage ensemble comprising:
    a main suitcase;
    an auxiliary suitcase;
    means for detachably attaching the auxiliary suitcase to the main suitcase;
    wheels located along an edge of the body of the main suitcase;
    a retractable handle having a rod with a plurality of holes at various elevations and a grip member located at the upper extremity of the rod;
    a tubular housing adapted to slidably accommodate the rod of the retractable handle, which tubular housing is fixedly attached to the inner surface of the bottom of the main suitcase and arranged to extend from the edge of the suitcase at which the wheels are located and beyond the surface of the opposite side of the suitcase and which portion projecting beyond the surface of the suitcase is provided with a recess to accommodate the retractable handle grip when the retractable handle is in the nested position; and
    a spring biased detent pin mounted on the exterior of the tubular housing and arranged to extend transversely through the tubular housing which detent pin can be aligned with each of the holes in the retractable handle rod.

12. A luggage ensemble comprising:
    a main suitcase;
    an auxiliary suitcase;
    means for detachably attaching the auxiliary suitcase to the main suitcase;
    wheels located along an edge of the body of the main suitcase;
    a retractable handle having a rod with a plurality of slot members therein and a grip member located at the upper extremity of the rod;
    a tubular housing adapted to slidably accommodate the rod of the retractable handle, which tubular housing is fixedly attached to the inner surface of the bottom of the main suitcase and arranged to extend from the edge of the suitcase at which the wheels are located and beyond the surface of the opposite side of the suitcase and which portion projecting beyond the surface of the suitcase is provided with a recess to accommodate the retractable handle grip when the retractable handle is in the nested position and which portion projecting beyond the surface of the suitcase has a slot formed therein with which each of the slots in the retractable handle rod can be aligned; and
    a spring biased detent having longitudinally extending arms and a transverse stop member extending therebetween; which spring biased detent is secured to the portion of the tubular housing extending beyond the suitcase with the transverse stop member located in the slot in the tubular housing.

13. A luggage ensemble comprising:
a main suitcase;
an auxiliary suitcase;
means for detachably attaching the auxiliary suitcase to the main suitcase;
wheels located along an edge of the body of the main suitcase;
a retractable handle having a rod and a grip member located at the upper extremity of the rod;
two lug members diametrically opposed on the rod of the retractable handle which lug members have a beveled surface thereon;
a tubular housing adapted to slidably accommodate the rod of the retractable handle, which tubular housing is fixedly attached to the inner surface of the bottom of the main suitcase and arranged to extend from the edge of the suitcase at which the wheels are located and adapted to project beyond the surface of the opposite side of the suitcase and which portion projecting beyond the surface of the suitcase is provided with a recess to accommodate the retractable handle grip when the retractable handle is in the nested position and a slot formed therein;
a spring biased detent having longitudinally extending arms arranged on each side of the retractable tubular housing; and
a transversely extending stop member arranged between the longitudinally extending arms; the stop member having an indentation therein to conform to a portion of the retractable handle rod, which stop member is located in the slot in the portion of the tubular housing projecting beyond the suitcase whereby the retractable rod can be elevated to a position wherein the lower surface of the lugs rest on the upper surface of the stop member to positively locate the retractable handle.

14. A luggage ensemble comprising:
a main suitcase;
an auxiliary suitcase;
means for detachably attaching the auxiliary suitcase to the main suitcase;
wheels located along an edge of the body of the main suitcase;
a retractable handle having a rod and a grip member located at the upper extremity of the rod;
a pin extending transversely from the retractable handle rod;
a tubular housing adapted to slidably accommodate the rod of the retractable handle, which tubular housing is fixedly attached to the inner surface of the bottom of the main suitcase and arranged to extend from the edge of the suitcase at which the wheels are located and adapted to project beyond the surface of the opposite side of the suitcase and which portion projecting beyond the surface of the suitcase is provided with a recess to accommodate the retractable handle grip when the retractable handle is in the nested position and a slot whereby elevation of the rod to the plane of the slot in the housing and rotation of the rod will locate the pin in the slot to lock the handle in a fixed position.

15. Apparatus as in claim 14 further comprising a leaf spring having a hole therein which leaf spring is attached to the tubular housing with the hole aligned with the slot in the tubular housing.

References Cited

UNITED STATES PATENTS

| | | | |
|---|---|---|---|
| 3,163,268 | 12/1964 | Leavell | 190—18(2) |
| 3,257,051 | 6/1966 | Browning | 280—47.13X |
| 3,257,120 | 6/1966 | Browning | 280—47.17 |

FOREIGN PATENTS

| | | | |
|---|---|---|---|
| 684,519 | 4/1964 | Canada | 280—47.13 |
| 59,346 | 1/1954 | France | 190—18(2) |
| | | (addition to No. 968,949) | |

LEO FRIAGLIA, Primary Examiner

J. A. PEKAR, Assistant Examiner

U.S. Cl. X.R.

190—18A, 57